(12) United States Patent
Ick

(10) Patent No.: US 9,607,225 B2
(45) Date of Patent: Mar. 28, 2017

(54) METHOD FOR DETECTING TARGET OBJECTS IN A SURVEILLANCE REGION

(75) Inventor: Julia Ick, Berlin (DE)

(73) Assignee: Hella KGaA Hueck & Co., Lippstadt (DE)

(*) Notice: Subject to any disclaimer, the term of this patent is extended or adjusted under 35 U.S.C. 154(b) by 847 days.

(21) Appl. No.: 14/000,214

(22) PCT Filed: Feb. 17, 2012

(86) PCT No.: PCT/EP2012/052815
§ 371 (c)(1),
(2), (4) Date: Oct. 29, 2013

(87) PCT Pub. No.: WO2012/110653
PCT Pub. Date: Aug. 23, 2012

(65) Prior Publication Data
US 2014/0049647 A1 Feb. 20, 2014

(30) Foreign Application Priority Data

Feb. 18, 2011 (DE) .................. 10 2011 011 929

(51) Int. Cl.
*H04N 7/18* (2006.01)
*G06K 9/00* (2006.01)
*G06T 7/20* (2017.01)

(52) U.S. Cl.
CPC ..... *G06K 9/00791* (2013.01); *G06K 9/00771* (2013.01); *G06T 7/20* (2013.01);
(Continued)

(58) Field of Classification Search
CPC .. G06K 9/00771; G06K 9/00791; G06K 9/00; G06T 7/2006; G06T 2207/10021;
(Continued)

(56) References Cited

U.S. PATENT DOCUMENTS 6,658,136 B1* 12/2003 Brumitt .............. G06K 9/00771
382/103
7,003,136 B1 2/2006 Harville
(Continued)

FOREIGN PATENT DOCUMENTS

DE 102007000449 A1 3/2008

OTHER PUBLICATIONS

Ho-Chao, Chen et al., "People Counting system for Getting in-out of a Bus Based on Video Processing", Eighth International Conference on Intelligent Systems Design and Applications, Intelligent Systems Design and Applications, Nov. 26, 2008 ( pp. 565-569).

(Continued)

*Primary Examiner* — Shawn An
(74) *Attorney, Agent, or Firm* — Faegre Baker Daniels LLP

(57) ABSTRACT

The present application presents methods and apparatuses for detecting target objects in an image sequence of a monitoring region. In some examples, such methods may include adjusting pixel values of images of the image sequence for interference components associated with at least one interfering object, generating the interference components associated with the at least one interfering object that is situated in the monitoring region, searching the image sequence for the target objects based on the adjusted pixel values, detecting a start of a predetermined sequence of motions associated with the interfering object, and computing an instantaneous position of the at least one interfering object during the predetermined sequence of motions, wherein adjusting the pixel values of the images is based upon the instantaneous position.

15 Claims, 5 Drawing Sheets

(52) U.S. Cl.
CPC .............. *G06T 7/2006* (2013.01); *G06K 9/00* (2013.01); *G06T 2207/10021* (2013.01); *G06T 2207/30196* (2013.01); *G06T 2207/30232* (2013.01); *G06T 2207/30248* (2013.01)

(58) Field of Classification Search
CPC . G06T 2207/30196; G06T 2207/30232; G06T 2207/30248; G06T 7/20
See application file for complete search history.

(56) References Cited

U.S. PATENT DOCUMENTS

| | | | |
|---|---|---|---|
| 2002/0051058 A1* | 5/2002 | Ito | G06K 9/00771 348/152 |
| 2004/0017929 A1 | 1/2004 | Bramblet et al. | |
| 2009/0010490 A1* | 1/2009 | Wang | G06K 9/00771 382/103 |

OTHER PUBLICATIONS

International Search Report issued in PCT/EP2012/052815, mailed Jun. 5, 2012, 5 pages (with English translation).

Yang, Tao et al., "Clustering method for counting passengers getting in a bus with a single camera", Optical Engineering, vol. 49, No. 3, Mar. 2010, 10 pages.

* cited by examiner

METHOD FOR DETECTING TARGET OBJECTS IN A SURVEILLANCE REGION

CROSS-REFERENCE TO RELATED APPLICATION

This application is a national phase application of PCT Application No. PCT/EP2012/052815, internationally filed Feb. 17, 2012, which claims priority to German Application No. 10 2011 011 929.9, filed Feb. 18, 2011, both of which are herein incorporated by reference in their entirety.

TECHNICAL FIELD

The invention relates to a method for detecting target objects in an image sequence of a monitoring region and to a system for carrying out such a method. The invention further relates to a vehicle comprising such a system.

BACKGROUND

Methods of this type are frequently employed to count or track persons or other moving objects located in a monitoring region or passing through a monitoring region. Potential fields of application include, for example, the entrance region of a building or a door of a vehicle used in passenger transportation, such as a train or bus. The image sequences are recorded by a camera for this purpose and subsequently evaluated by an appropriately equipped evaluation unit, for example, by way of image segmentation, pattern analysis, movement analysis and/or another image analysis method based on image data of the image sequence.

Typically, in addition to locating target objects, further objects, so-called interfering objects, are located within the monitoring region. These interfering objects are not ordinarily counted or tracked, but they can be reliably distinguished from the target objects. Customarily, an attempt is made to solve this problem by assigning target and interfering objects to differing movement classes. For example, the target objects to be detected, which have a typical speed, can be assigned to a first movement class, and interfering objects, which may be spatially stationary objects can be assigned to a second movement class. In the corresponding detection method, it is then possible to suppress all stationary interfering objects from the images of the image sequences using known image processing methods. Thereafter, the images of the image sequence adjusted in this way are analyzed for the presence of the target objects.

However, in many cases it is not possible to assign target and interfering objects to differing movement classes. For example, vehicle doors in buses and trains, other door types, and people are not purely stationary objects. Thus, these objects cannot be suppressed in the conventional manner described above.

It is therefore the object of the present invention to propose a method for detecting target objects in an image sequence of a monitoring region, wherein the method overcomes, or at least mitigates, the problems of the prior art. The method allows for the detection of target objects within a monitoring region. For this purpose, the monitoring region may additionally include interfering objects, which, similarly to the target objects, may be mobile. In addition, a system is proposed, which is suitable for the detection of moving target objects in a monitoring region, in which the moving target objects and moving interfering objects may be located. Finally, a transportation vehicle is proposed, wherein the vehicle is suitable for detecting and counting persons entering the vehicle or exiting the vehicle.

This object is achieved by a method having the aspects of the claims below and by a system having the aspects of the additional independent claim below. Advantageous embodiments and refinements will be apparent from the characteristics of the dependent claims.

SUMMARY

According to an example method of the invention for detecting moving target objects (e.g. persons) in an image sequence of a monitoring region, pixel values of images of the image sequence are adjusted for interference components. Such interference components are generated by at least one interfering object located in the control region. Thereafter, the image sequence is searched for the target objects based on the adjusted pixel values, for example, by way of one of said image analysis methods (image segmentation, pattern analysis, movement analysis or the like).

To this end, the term 'pixel value' generally denotes a value for an individual pixel (picture element) of an image that is computed in a predetermined manner from raw data of an image, wherein the value can be numerical or logical in some examples. A pixel value may also be computed from the raw data of a coherent region of neighboring pixels, for example, by way of an averaging method.

Objects can be detected based on pixel values, for example, by combining neighboring pixels (picture elements) having similar pixel values to form image segments and by classifying image segments that correspond to predetermined selection criteria as target objects. Possible selection criteria include the size and/or the shape of an image segment and whether the pixel values of the pixels within an image segment are within predetermined bounds.

For the proposed method, a starting time of a predetermined, known sequence of motions of the at least one interfering object is detected and an instantaneous, current position of the interfering object is determined within the images during the sequence of motions. The instantaneous position of the interfering object is taken into consideration in the subsequent adjustment of the pixel values for the interference components of the interfering object. The sequence of motions of an interfering object is referred to as "predetermined" or "known" for purposes of the present disclosure if it is known how the instantaneous position of the interfering object can be computed or simulated during the sequence of motions.

Using the proposed method, it is thus possible to suppress interfering objects within the monitoring region wherein the sequences of motions of the interfering objects are known and wherein the start of the sequence of motions can be detected in an accurate and reliable manner. It is further possible to computationally eliminate the components (interference components) of the interfering objects in the pixel values of the images.

It can thus be assured that pixels, or picture elements, in the image sequence that are associated with the target objects are not confused with pixels, or picture elements, of the interfering object. Furthermore, any merging of pixel regions (segments) associated with interfering objects and pixel regions associated with target objects can be limited such that detection of the target objects becomes easier and more reliable.

According to one embodiment of the method, the picture elements of each image are transferred into a three-dimensional coordinate system, referred to as a world coordinate system. The origin of this coordinate system is preferably located at the height of a base area of the monitoring region, which may be a floor of the monitoring region. Furthermore, an XY plane of this coordinate system may extend within this base area. The height of each picture element is indicated perpendicular to this XY plane or is determined by way of the evaluation unit. In some examples, the origin of the coordinate system is positioned directly beneath the camera that generates the image sequence.

The image sequence is preferably recorded by a stereo camera. Each of the images then includes two individual images that are recorded from two different perspectives, which can be used for a three-dimensional representation of the monitoring region. In particular, each (stereo) picture element of a stereo image, which is indicated in each case by two picture elements of the two individual images of the image, can be transferred into the three-dimensional world coordinate system as described above.

In addition, a height map and/or an occupancy map of the monitoring region may be computed for each image of the image sequence. For this purpose, the base area of the monitoring region, which may include the XY plane of the world coordinate system, is broken down into a map grid. The individual grid elements may correspond to area regions of the base area of the monitoring region, which may measure 5×5 cm in some non-limiting examples. To compute the height map and the occupancy map for an image, these picture elements are determined for each of the grid elements in the image, which may contain an arbitrary object, such as a target object or an interfering object or a portion thereof. In some embodiments, these picture elements can be detected regardless of whether the base area is hidden by this object.

The coordinates in the world coordinate system and the associated grid element beneath the picture element are determined for each of these picture elements. Then, the height of the highest picture element in which an object is depicted is entered for each grid element in the height map. This maximum height of a grid element is also referred to hereafter as the height value of the grid element. The occupancy map includes, for each grid element, the number of all picture elements in which a respective object is depicted. This number is also referred to hereafter as the occupancy value of a grid element.

In some embodiments of a method presented herein, a stereo camera system is used to record the image sequence and a grid area within the base area of the monitoring region is associated with each picture element of the three-dimensional images of this image sequence. After this association, as described above, a height map and an occupancy map are computed. The pixel values stored in these maps (e.g. the height values and occupancy values associated with the grid elements) are then adjusted for interference components of interfering objects.

According to one embodiment of the method, after the position of the interfering object in an image has been determined, the height values and/or the occupancy values are zeroed for those grid elements of the image, within which the interfering object is located. The pixel values of the image can thus be reliably adjusted for interference components of the interfering object.

According to some example embodiments of the method presented herein, the instantaneous position of the interfering object is computed based on a movement model, which may include a predetermined computing method. This means that the movement of the interfering object is simulated by way of the movement model as soon as the start of the movement of the interfering object has been detected. To this end, the movement model may include one or more model parameters, which are determined either in an initialization phase or during a first training phase. The at least one model parameter can be a numeral, a logical value, and/or a multidimensional vector of such variables, such as, but not limited to, a set of world coordinates or line and column indices. As an alternative, the instantaneous position of the interfering object may be determined in each case by observing the interfering object after the start of the sequence of motions has been detected. In an example case in which the interfering object is a door and the sequence of motions is the opening of a door, any arbitrary door detection may be used.

In some examples, the model parameters may include a resting position of a particular sub-region of the interfering object within an image. Such a sub-region can be a lower edge of an interfering object, such as that of a door. A further model parameter may be an opening region within an image, the region being associated with one or more interfering objects, such as, but not limited to, a passage opening within an interfering object that is a door. A time period between a start of the sequence of motions and a signal is another possible model parameter. This signal can be a trigger signal, which may comprise a signal that triggers the sequence of motions of the interfering object, such as a trigger signal of an automatic door opener. However, the signal can also be a measurement signal of a sensor that is used to monitor the movements of the interfering object. A motion sensor of any type may be used on a door to generate such a signal, and may include any sensor using an inductive, capacitive or optoelectronic sensor element. Furthermore, the start of the sequence of motions may be determined based on the pixel values of the image sequence recorded by the camera, an evaluation of images recorded by another camera, and/or a measurement signal of a sensor that is different from the camera. Additionally, the described manners of detecting the start of the sequence of motions may be combined with each other. In some examples, the start of the sequence of motions may be detected based on images using the evaluation unit and using a corresponding measurement signal that is generated by a further motion sensor or a trigger signal of an operating unit that is generated and received by the evaluation unit.

Moreover, in some examples, the movement model may comprise or utilize a movement equation for the interfering object. This movement equation may include one or more of the model parameters. Example model parameters for such a movement equation may include the absolute or average velocity of the interfering object, the time difference between the measurement or trigger signal and the start of the motion, and the resting position of the interfering object. The movement model may additionally include a method by which model parameters of the movement model (e.g., those model parameters that are considered in the movement equation) of the interfering object are determined and/or optimized.

In some examples, the model parameter, such as a model parameter that indicates the time delay between a trigger signal of the sequence of motions and the start of the sequence of motions, is determined by one or more measurements of this time delay. In a corresponding method for determining this model parameter, the trigger signal (e.g., that of a door opener) may be received by the evaluation unit at a time $t_0$, which may be stored in memory. Subsequently, the evaluation unit determines the time $t_1$, which may be the recording time ("time stamp") of that image in which the evaluation unit has detected the start of the sequence of motions triggered by the trigger signal. In the example of an opening motion of a door, the start of this opening motion can be detected by the evaluation unit based on a door gap that forms, which must have a predetermined minimum width Δx. The required time delay is then computed by the evaluation unit using the difference between these two times, $t_1-t_0$, and assigned to the corresponding model parameter.

The method for determining and/or optimizing the model parameters can be employed during the initialization phase mentioned above, or during the first or a subsequent training phase.

Additionally, the velocity of the interfering object during the sequence of motions can, in some examples, be based on the quotient of the distance traveled during the sequence of motions and the duration of the sequence of motions. This distance can be indicated or measured, for example, as the number of picture elements or grid elements that were passed through. Positions of objects, or of parts of objects, can be indicated or measured in world coordinates or in line and column indices of picture elements (pixels) or grid elements.

In a possible embodiment of the method in which picture elements of the images of the monitoring region recorded by the camera are transferred into a height map and/or occupancy values, one of the model parameters may be a line index of a starting line or of an ending line of the interfering object within such a height or occupancy map of an image, a gap index of a center gap between two parts of the interfering object in a height or occupancy map of an image, or an average time difference between a trigger signal for the sequence of motions of the interfering object or a measurement signal of a (motion) sensor and the start of the sequence of motions that can be detected in an occupancy map or height map of an image. One of the model parameters may be an average motion velocity of the interfering object, wherein the motion velocity may be defined as the number of pixels in an occupancy map traveled per unit of time. Additional model parameters may define a direction (e.g., horizontal, vertical or oblique) of the sequence of motions or a movement curve.

Additionally, within the first training phase, subsequent to setting starting values or initial values for one or more model parameters, several measurements of these or other model parameters may be carried out. Furthermore, after each measurement, the generated model parameters may be averaged. In some examples, a distinction is made between successful and unsuccessful measurements. An unsuccessful measurement may occur where an image region that is relevant for the measurement of a model parameter has been hidden by a target object (e.g., a person) in the monitoring region.

As described above, the value of one or more model parameters may be predetermined in an initialization phase. An initial model parameter value can subsequently be maintained as a constant value of the model parameter or may be further optimized in the following procedure within training phases, as will be described below. One option for predetermining the initial value of a model parameter, which is defined by a resting position of the interfering object, is to enter the value via a graphical user interface. In some examples, an image of the monitoring unit is displayed by a monitor during an initialization phase of the method, and the position of the interfering object (e.g., a lower edge of a door) is marked in the image on the monitor by way of a mouse, a touch screen, or another suitable interface. Subsequently, based on the marking, the world coordinates of the resting position or the course of the lower edge of the door (the height and the length of the lower edge) may be computed and stored as corresponding values of the model parameter in an evaluation unit. Using the monitor or another suitable manner, it is also possible to enter the resting position of a center between two mutually adjoining leaves of a door as a further model parameter. Subsequently, the world coordinates of this position may again be computed, for example, based on the corresponding marking on the monitor These world coordinates may be stored in an evaluation unit as the corresponding value of the associated model parameter.

Additionally, initial values of model parameters are computed as functions of entered initial values of other (model) parameters. Thus, an initial search region for the interfering object may be determined from a resting position of an interfering object. In the case of a two-leaf door, the lower edge and center of which were initialized as described above, a bottom and a top pixel row or row of grid elements can be determined. These bottom and top pixel or grid rows can be used to limit a search region for the interfering object within the images, or within the height maps and/or the occupancy maps, between these pixel or grid rows.

In addition, one or more model parameters of the movement model may be continually optimized in a second training phase of the method, which may directly follow the first training phase or the initialization phase in some examples. Furthermore, measurement values that deviate drastically from the current or the preceding model parameter values are neglected or weighted to a lesser degree.

In some examples, the interfering object can be a door, and the sequence of motions can be the door being opened or closed. The door may comprise two leaves, which can be pushed apart or folded out. Furthermore, these two door leaves may be symmetrical, such that a central passage opening through the door forms when the two door leaves are opened. In some examples, the door can be a passenger door of a bus or passenger train.

Furthermore, if the interfering object, or a part of the interfering object, frequently, predominantly, or exclusively assumes predetermined and known positions and/or moves back and forth between such positions, the instantaneous position of the interfering object, or of said part of the interfering object, may be compared to these positions. In such examples, it is then possible to determine and indicate whether the interfering object, or said part of the interfering object, is at present in one of these positions, or whether it is at present moving toward one of these positions, and if so, which of the positions it is in or toward which of the positions it is moving.

Said predetermined and known positions of the interfering object, or of the part of the interfering object, can be the resting position(s) of the interfering object or of the part of the interfering object. If the interfering object is a door, the resting positions may be a closed position and an open position, and, accordingly an opening motion and a closing motion of the door can be determined. In such an example, the instantaneous position of the door, or of a part of the door, is compared to these resting positions, and it may be determined whether the door is at present in the open position or the closed position, or whether it is at present opening or closing. In addition, corresponding signals may be generated, in which this information is encoded.

According to some example methods, target objects are additionally tracked and/or counted in the monitoring region by the evaluation unit. In particular, it is possible for persons passing through the monitoring region in a predetermined direction to be counted.

Furthermore, a system is provided for detecting target objects within an image sequence of a monitoring region. Such a system may comprise a camera for recording the image sequence and an evaluation unit, which is connected to the camera for data transmission and equipped to adjust pixel values of images of the image sequences for interference components. The interference components may originate from at least one interfering object situated in the control region. The evaluation unit may additionally be equipped to search the image sequence for the target objects based on the adjusted pixel values. Additionally, the evaluation unit may be further equipped to detect a start of a predetermined sequence of motions of the interfering object, to determine an instantaneous position of the interfering object within the images during the sequence of motions, and/or to take the instantaneous position of the interfering object into consideration in the adjustment of the pixel values for the interference components of the interfering object.

The example systems according to the present disclosure are thus suitable for the exclusion or computational elimination of interfering influences of interfering objects. The sequences of motions are known or determinable from the pixel values of the images, and thereby may improve a separation of, or a discrimination between, target objects and interfering objects in the image sequence of the monitoring region and may increase a hit rate and/or a counting accuracy of the target objects.

Moreover, the evaluation unit is equipped to compute or simulate the instantaneous position of the at least one interfering object based on a movement model, as described above for example methods according to the present disclosure. It is thus also possible to predetermine corresponding model parameters or to optimize the system in a training phase, wherein the evaluation unit is equipped to generate and average measurement values for the parameters and replace the model parameters with such averaged parameter values.

Finally, the evaluation unit of the system may be suited, from a programming point of view, to carry out one or more of several embodiments described above or refinements of the proposed method. This results in the cited advantages of the example methods presented herein.

In a further embodiment of the system, the camera is a stereo camera and is thus suitable for the generation of images that each comprise two individual images. The images of a stereo camera, which frequently are also referred to as stereo images, allow a three-dimensional representation of the monitoring region. Stereo images allow picture elements of the stereo images to be transferred into a three-dimensional image coordinate system. In addition, the evaluation unit may be equipped to convert the picture elements that are transferred into the world coordinate system into height maps or into occupancy maps.

In some examples, the system may comprise a motion sensor that may generate the image sequence and completely or partially pick up the sequence of motion, or start thereof, of one or more interfering objects and transmit corresponding measurement signals to the evaluation unit. Thus, the start of the sequence of motions can be encoded in these measurement signals. The evaluation unit is preferably equipped to determine the start and/or the entire course of the interfering object in question based on these measurement signals. In a non-limiting aspect, the sensor may comprise an electric, electronic, inductive, capacitive and/or optoelectronic sensor element, such as a complimentary metal-oxide semiconductor (CMOS) chip or charge-coupled device (CCD) chip.

In addition, a vehicle for transporting persons is proposed herein. In some examples, the vehicle may comprise at least one vehicle door and an operating unit that is equipped to generate a trigger signal for the vehicle door to open automatically. Furthermore, the operating unit may be connected to the vehicle door so as to transmit the trigger signal. The vehicle may additionally comprise a system of the type proposed in the present disclosure. For example, the evaluation unit of the system may be connected to the door or to the operating unit of the door and may receive the trigger signal, which signals the start of the opening of the door, which may be the interfering object in such an example.

BRIEF DESCRIPTION OF THE DRAWINGS

The invention will be described in greater detail hereafter based on specific exemplary embodiments shown in FIGS. 1 to 10. In the drawings.

In the Figures, identical reference numerals denote identical or similar features.

DETAILED DESCRIPTION

Figure 1:
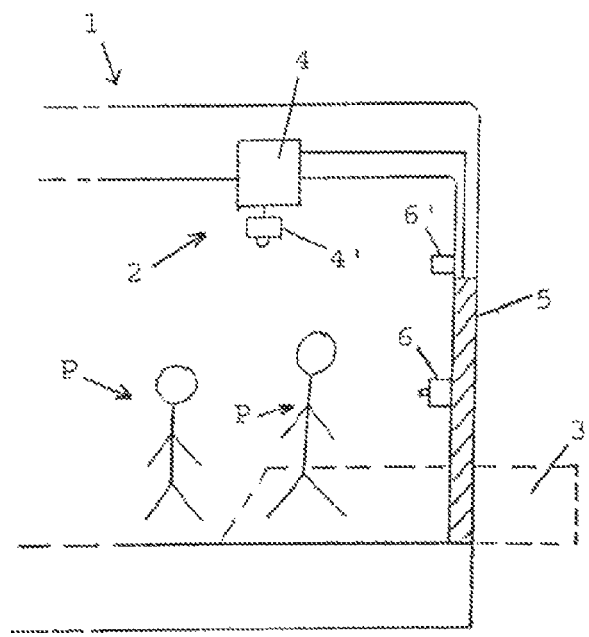
FIG. 1 illustrates a vehicle comprising a system according to the present disclosure.

FIG. 1 is a schematic illustration of a cross-sectional view through a vehicle 1 for passenger transportation, for example a bus or a train. The vehicle includes an example embodiment of the system 2 of the present disclosure.

The system 2 comprises a stereo camera 4' for recording an image sequence of stereo images, hereafter referred to in short as images, of a monitoring region 3, which in FIG. 1 and subsequent figures is denoted by a dotted line. Each of the images comprises two individual images wherein the monitoring region 3 is depicted in two different perspectives. The stereo camera 2 is connected to an evaluation unit 4 of the system for transmitting raw data of the images to the evaluation unit 4.

An automatic vehicle door 5 of the vehicle 1 is situated within the monitoring region 3. This door is connected to an operating unit 6, which is equipped to generate a trigger signal and transmit the trigger signal to the door when operated by a passenger P. The door 5 is equipped to open after the trigger signal has been received. In addition, a further motion sensor 6' is provided, which may detect the movement of the door, for example, with a mechanical, electronic, optoelectronic, inductive or another sensor element connected to the door. This motion sensor 6' is likewise connected to the evaluation unit 4 so as to transmit appropriate measurement signals, wherein start of the opening motion of the door 5 may be encoded. The evaluation unit 4 is equipped to process the measurement signals and to determine the time of start based on the measurement signals and the trigger signal of the operating unit 6.

Figure 2:
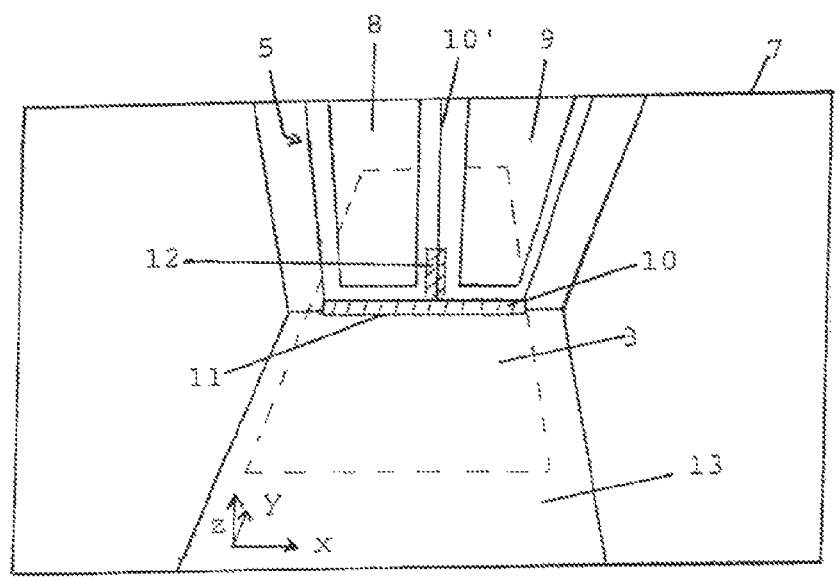
FIG. 2 illustrates an image of a monitoring region, which is recorded by the system shown in FIG. 1.

FIG. 2 is a schematic illustration of one of the images 7 of the monitoring region 3, which was captured by the stereo camera 4' of the system 2 shown in FIG. 1 during an initialization phase of the system and is indicated by way of a monitor (not shown) of the system 2.

The door 5 may have a left and a right door leaf 8, 9, which are in contact with each other at a center line 10' of the door 5 when the door 5 is closed.

In the image 7 shown, the position of a lower edge 10 of the door 5 is marked by a marking line 11 extending along an entire width of the door 5. In addition, the position of the center line 10' is identified in the image 7 by way of a further marking 12. The two markings 11, 12 may be entered into the evaluation unit 4 by way of an input interface (not shown), which may include, but is not limited to a touch screen function of a monitor, a mouse, or another input interface suitable for setting markings within the image 7.

The evaluation unit 4 is equipped to transfer the picture elements of the image 7 (and of all further images captured by the stereo camera 4') into a three-dimensional coordinate system (world coordinate system) and to compute the corresponding (world) coordinates of the picture elements. The origin of this coordinate system, as illustrated in FIG. 2, may be located at the height of a base area 13 or floor of the monitoring region 3. This floor may extend beyond the monitoring region 3. Additionally, the XY plane of this coordinate system extends within this base area 13. The height of each picture element of the image 7 (and of all further images) is thus determined perpendicular to this XY plane along the Z axis of the world coordinate system by way of the evaluation unit 4.

The evaluation unit 4 additionally may be configured to compute a height map and an occupancy map of the monitoring region for each image of the image sequence.

Figure 3:
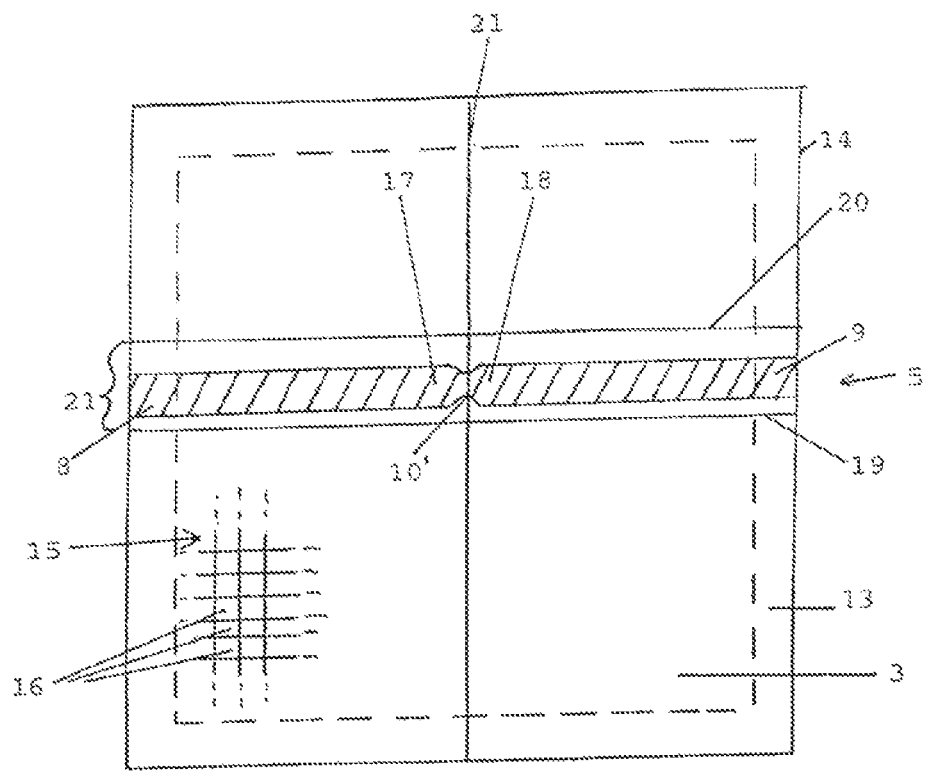
FIG. 3 illustrates an occupancy or height map of the image shown in FIG. 2 during an initialization phase of the system.

FIG. 3 is a schematic illustration, by way of example, of the height map or the occupancy map 14 of the image 7 shown in FIG. 2.

A section of a map grid 15 comprising grid elements 16, into which the base area 13 within the monitoring region 3 is broken down, is illustrated. The individual grid elements 16 in this example correspond to area elements of the base area 13 measuring 5×5 cm each. In an aspect, to compute the height map and the occupancy map, the evaluation unit 4 may determining for each of these grid elements 16, which picture elements of the image 7 depict any arbitrary object, such as a target object (here, a passenger) or an interfering object (here, door 5) or a part of these objects. Picture elements hidden by this object, or "occupied," may thus be detected, as the base area 13 is hidden by the object in such picture elements.

The associated coordinates in the world coordinate system, and likewise the associated grid element 16 directly beneath the picture element, are determined for each of these occupied picture elements. Then, the height of the highest occupied picture element is entered for each grid element 16 in the height map of each image. This height is also referred to hereafter as the height value of the associated grid element 16. The occupancy map of each image includes the number of all occupied picture elements for each grid element 16. This number is also referred to hereafter as the occupancy value of a grid element 16.

The height map or occupancy map 14, shown in FIG. 3, of the image 7, shown in FIG. 2, shows image regions in which the height values or occupancy values have a value different from zero in hatched form. In the example shown, only the door 5 is located within the monitoring region 3.

As mentioned above, the system 4 is in an initialization phase at the time the image 7 was recorded. During this phase, initialization values for model parameters of a movement model for the simulation of the opening motion of the door 5 are established or measured. An instantaneous position of the door 5 during the opening motion can be determined in each image and may be recorded during the opening motion by the camera 4' based on this movement model for the opening motion of the door 5. Thereafter, all grid elements 16, within which or above which the door 5 is located at present, are determined based on the instantaneous position of the door 5 that was thus determined. The height values and the occupancy values of these grid elements are then zeroed. The height values or occupancy values stored in these maps, which correspond to the pixel values derived from the raw data of the images, are thus adjusted for interference components of the door 5.

The first model parameter is a resting position of the lower edge 10 of the door 5, and the second model parameter is a resting position of the center line 10' of the door 5. The position of this center line 10' at the same time establishes the position of a passage opening of the door, which is formed between the edge regions 17 and 18 of the two door leaves 8 and 9 during the opening motion of the door 5. A third model parameter is a time period between the start of the opening motion and the trigger signal emitted by the operating unit 6, or a measurement signal of the motion sensor 6' signaling the start of the opening of the door. A fourth model parameter is an average velocity of the edge regions 17 and 18 of the door 5 during the opening motion. This velocity is defined by the quotient of distances traveled by the edge regions 17, 18 during the sequence of motions and the duration of the sequence of motions. Said distances are indicated or measured in each case as the number of grid elements 16 through which the edge regions 17, 18 have passed during the opening motion.

The above-mentioned positions of the parts 10, 10', 17, 18 of the door are indicated or measured both in world coordinates and in line and column indices of the associated grid elements 16 of the occupancy map and the height map 14.

The first model parameter, which is defined by the world coordinates and the line and column indices of the resting position of the lower edge 10, is computed from the course of the marking line 11 in image 7 by way of the evaluation unit 4. The coordinates, or line and column indices, of the lower edge 10 in the resting position of the door 5 thus determined are used to determine the initial values of at least two further model parameters. These at least two further model parameters may include the line index of a starting line 19 (fifth model parameter) and a line index of an ending line 20 (sixth model parameter) of the door 5 within the height and occupancy maps of the image 7. These two initial values are used to define an initial door region 21 between the starting and ending lines 19, 20 in which the course of the door 5 in the height or occupancy map 14 is expected in the subsequent images.

In addition, an initial value of the second model parameter, which is defined by a gap index of the resting position of the center line 10' of the door 5 in the height map or the occupancy map 14, is computed from the marking 12 in the image 7 by way of the evaluation unit 4. A center gap 21 defined by this gap index thus extends between the edge regions 17, 18 of the door 5 in the occupancy map or height map 14.

In addition, initial values of the third and fourth model parameters are entered by way of an input interface during the initialization phase.

The initialization phase is followed by a first training phase, in which the initial values of model parameters 2 to 5 are calibrated or determined more precisely by way of measurements. These measurements are carried out automatically by the evaluation unit 4 based on images recorded during this first training phase, wherein generated measurement values of the model parameters are averaged. Moreover, a distinction is made between successful and unsuccessful measurements. In some example unsuccessful measurements, a measurement of the second parameter is not successful if the center line 10' has been hidden by a person standing in front of the door 5.

Figure 4:
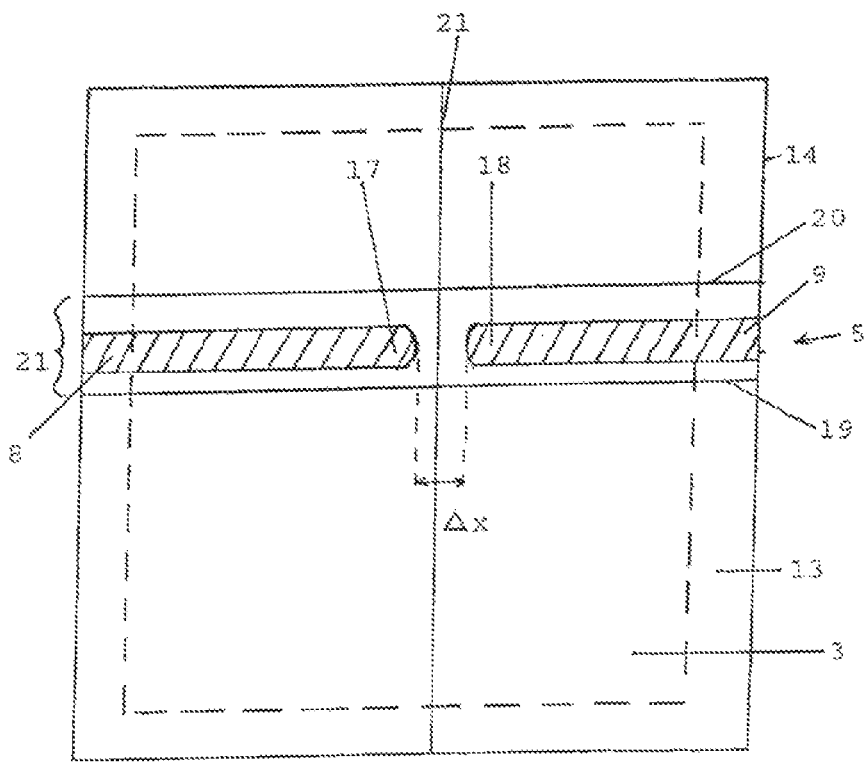
FIG. 4 illustrates a further occupancy or height map during a training phase of the system.

The start of the opening motion is defined in this example as the time at which a gap having a width $\Delta x$ of at least 3 grid elements (this being 15 cm), for example, between the two edge regions 17, 18 of the door 5 can be detected by the evaluation unit 4 in the height or occupancy map 14. This time is illustrated in FIG. 4. The third parameter, the time period that passes between receipt of the opening signal of the operating unit (trigger time) and the start of the opening motion (opening time), is measured by counting the number of images that have been captured between the trigger time and the opening time. Moreover, the second model parameter is measured at this time, which is the position of the center line 21, measured as the center between the two edge regions 17, 18 of the door 5. It would also be possible to define this time period as a time difference between the above-defined start of the motion and a particular measurement signal of the motion sensor 6', such as the measurement signal that signals the start of the opening motion of the door 5. In this way, for example, the time difference between the start of the actual, physical opening motion of the door and the start of the sequence of motions detectable by way of the height maps or occupancy maps could be taken into consideration.

Figure 5:
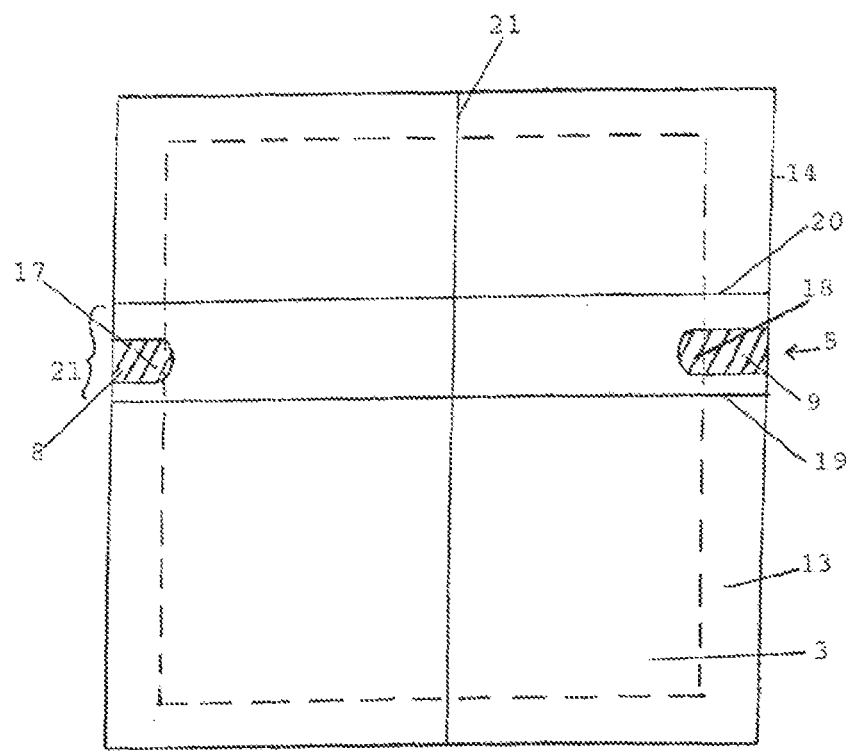
FIG. 5 illustrates a further occupancy or height map during a training phase of the system.

The end of the opening motion is defined as the time at which the two edge regions 17, 18 move out of the monitoring region 3 (ending time). This time is illustrated in FIG. 5. The fourth model parameter, this being the velocity with which the door leaves 8, 9 move outward, is measured by counting the number of images that have been captured between the trigger time and the ending time.

Figure 6:
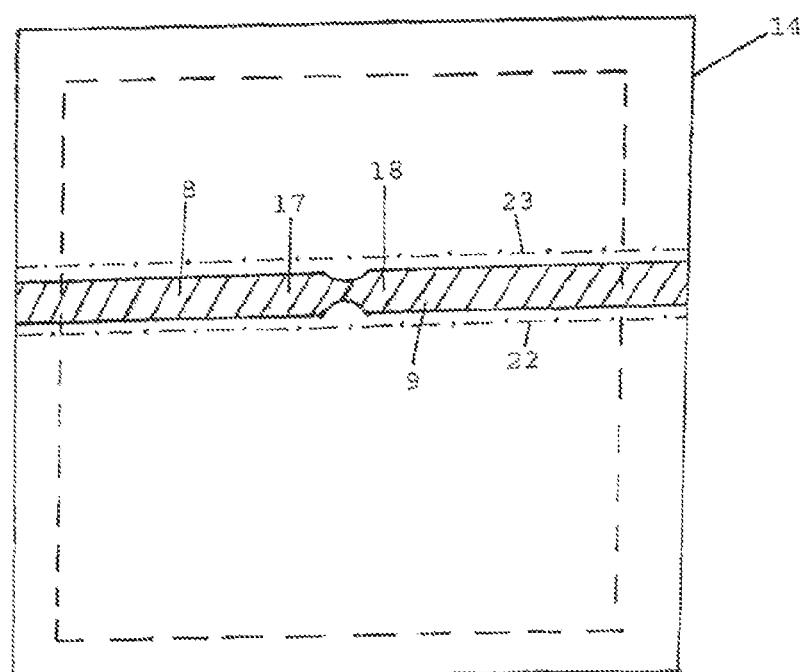
FIG. 6 illustrates a further occupancy or height map after a first training phase of the system.

The repeat measurements, taking place after the initialization phase, for optimization of model parameters two to four, which are incorporated in a movement equation of the movement model for determining the instantaneous position of the door 5, are carried out until sufficient consistency of these model parameters has been reached. In addition to model parameters two to four, two further model parameters, model parameters seven and eight, are determined. So as to determine these model parameters, all grid elements 16 that will be covered by the door 5 in at least one image during the opening motion are stored in the evaluation unit 4. The seventh model parameter is determined as the smallest line index of these stored grid elements, and the eighth model parameter is determined as the largest line index of these stored grid elements. The pixel lines associated with these two model parameters are shown in FIG. 6 as horizontal dot-dashed lines 22 and 23 above and beneath the door leaves 8 and 9. These lines are also referred to hereafter as starting and ending lines.

The phase of these measurements is also referred to as the first training phase. In some examples, approximately 5 to 10 successful measurements are required for each of the parameters in question. After this first training phase, the system 2 can computationally eliminate interference components of the door 5 from the height and occupancy maps. For this purpose, the instantaneous positions of the edge regions 17 and 18 are computed by the evaluation unit at each time based on model parameters 2 to 4, and the height values and the occupancy values for all those grid elements 16 over which the door leaves 8 or 9 extend at present are zeroed. These are all the grid elements that are located between the starting and ending lines 22, 23 and, at the same time, to the left of the instantaneous position of the left edge region 17 of the left door leaf 8, or between the starting and ending lines 22, 23 and, at the same time, to the right of the instantaneous position of the right edge region 17 of the right door leaf 9. During the opening motion of the door, the instantaneous positions of the left and right edge regions 17, 18 of the door are computed for this purpose by way of the evaluation unit 4 using the aforementioned movement equation of the movement model.

The height and occupancy values are thus adjusted for the interference components of the door 5, and the door 5 is suppressed from the occupancy and height maps 14. Subsequently, the passengers can be detected based on the height and occupancy values thus adjusted, for example, based on height and occupancy maxima in the height and/or occupancy maps. The height and occupancy maxima of the passengers can now no longer merge with the height and occupancy maxima of the door.

Figure 7:
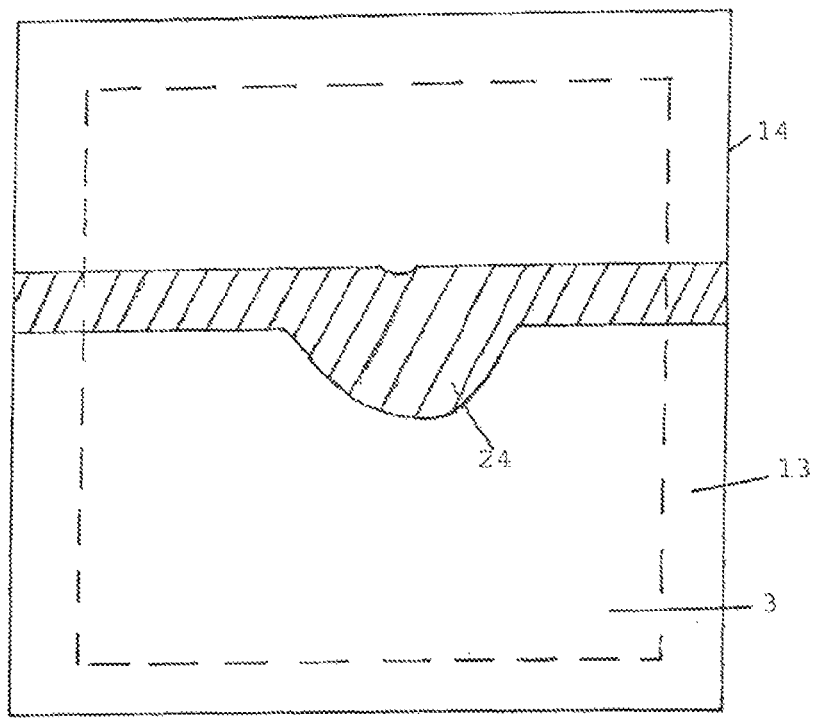
FIG. 7 illustrates an occupancy or height map comprising an interfering object and a target object prior to the adjustment of the pixel values of the map.
Figure 8:
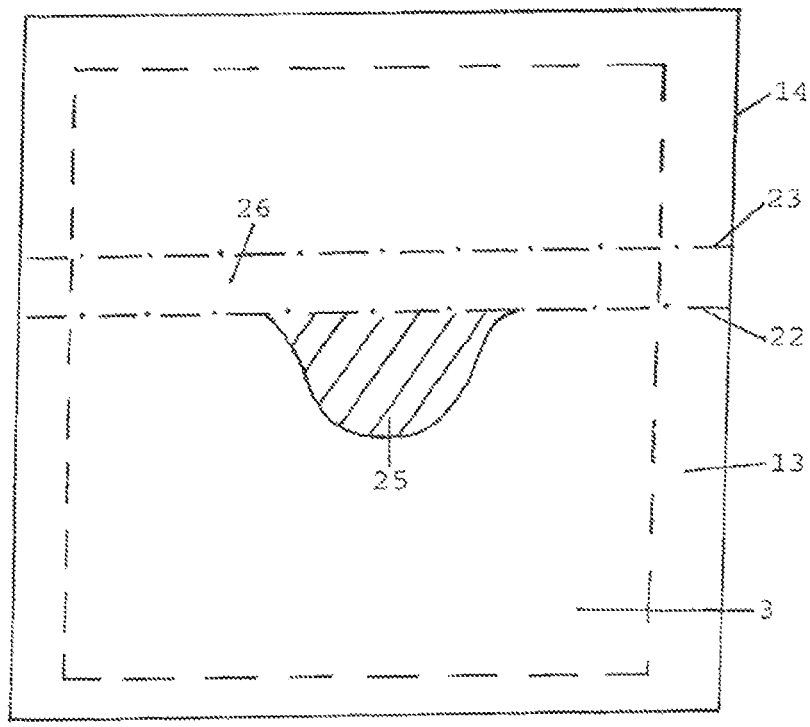
FIG. 8 illustrates the occupancy or height map of FIG. 7 after the adjustment of the pixel values.
Figure 9:
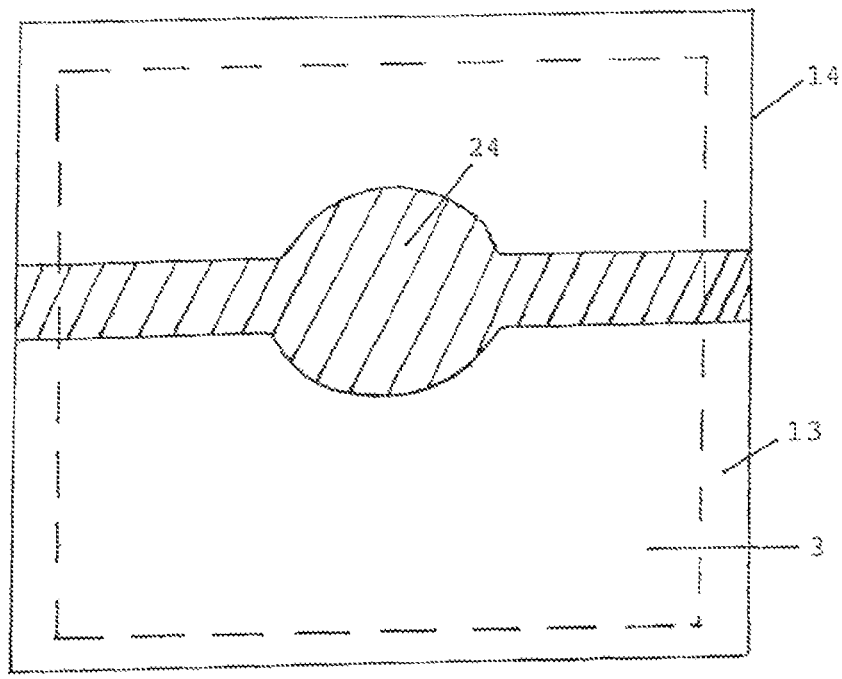
FIG. 9 illustrates an occupancy or height map comprising an interfering object and a target object prior to the adjustment of the pixel values of the map.
Figure 10:
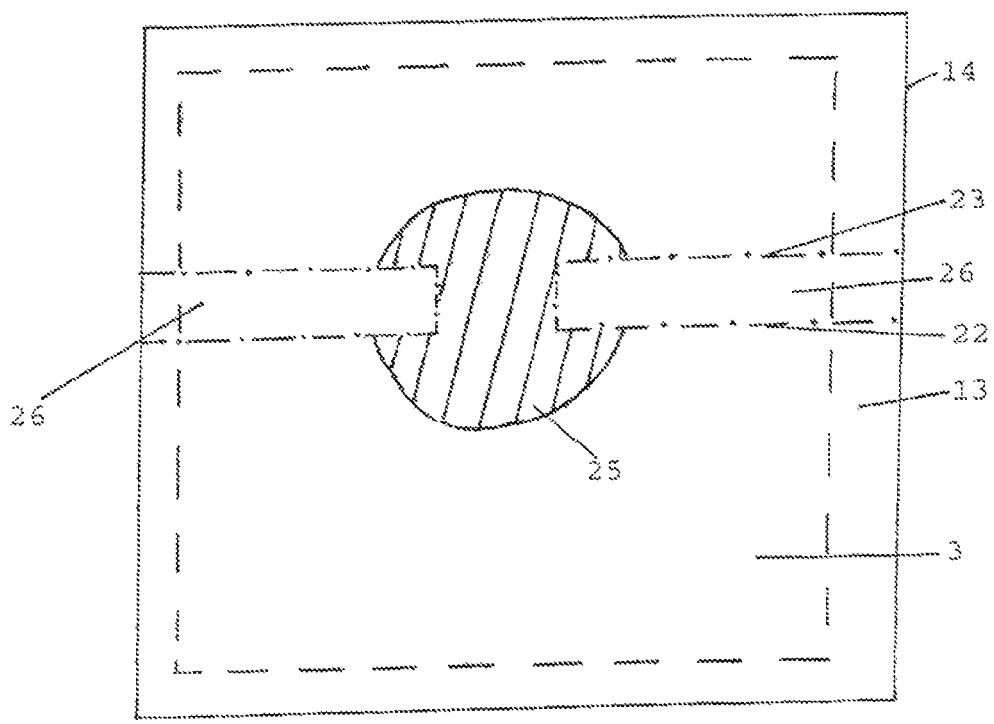
FIG. 10 illustrates the occupancy or height map of FIG. 9 after the adjustment of the pixel values.

This is to be illustrated based on the first situation shown in FIGS. 7 and 8 and based on the second situation shown in FIGS. 9 and 10.

In the first situation, a passenger is located directly in front of the door 5. FIG. 7 shows an occupancy or height map 14 of an image of this situation before the adjustment of the pixel values described above has been carried out. The hatched region in FIG. 7 is an image segment 24, which comprises grid elements having similar (unadjusted) height and occupancy values. FIG. 8 shows the height or occupancy map associated with this situation after adjustment of the pixel values. A segment 25 is shown, which, based on the shape thereof, can be detected as a person or passenger. The interference components of the door have been computationally eliminated, so that the pixel values in the image region 26 associated with the door are constantly zero. The door 5 has thus been suppressed from the height map or from the occupancy map 14.

In the second situation, a passenger has already moved into the door opening forming between the two door leaves 8, 9 during the opening of the door 5. FIG. 9 again shows a coherent segment 25 in which the passenger appears merged with the door and, as a result, is difficult or impossible to detect. Following the described adjustment of the pixel values for the interference components, the segment 25 shown in FIG. 10 is obtained, which can be detected as a passenger.

Finally, the evaluation unit is equipped to track and count the passengers. In some examples, passengers entering and exiting through the door 5 are counted.

Furthermore, in some examples, the first training phase is directly followed by a second training phase, in which model parameters two through four, seven, and eight are continually measured, as described above, and further optimized. In this way, these model parameters can be adapted to opening behavior of the door that changes over time. For this purpose, those measurement values that deviate relatively heavily from the instantaneous values of the model parameter are again neglected or weighted to a lesser degree.

The invention claimed is:

1. A method for detecting target objects in an image sequence of a monitoring region, comprising:
adjusting pixel values of images of the image sequence for interference components associated with at least one interfering object;
generating the interference components associated with the at least one interfering object that is situated in the monitoring region;
searching the image sequence for the target objects based on the adjusted pixel values;
detecting a start of a predetermined sequence of motions associated with the interfering object; and
computing an instantaneous position of the at least one interfering object during the predetermined sequence of motions, wherein adjusting the pixel values of the images is based upon the instantaneous position.

2. The method of claim 1, wherein the instantaneous position of the at least one interfering object is computed based upon a movement model, wherein the movement model includes at least one model parameter.

3. The method of claim 2, wherein at least one of the at least one model parameters is determined during an initialization phase as an initial value.

4. The method of claim 2, wherein at least one of the at least one model parameters is determined during a first training phase.

5. The method of claim 2, wherein at least one of the at least one model parameters is continually optimized during a second training phase.

6. The method of claim 2, wherein at least one of the at least one model parameters is one or more of a resting position of a sub-region of the at least one interfering object within an image, an opening region within an image belonging to one or more of the at least one interfering object, a time period between the start of the predetermined sequence of motions and a trigger signal that triggers the sequence of motions, and a velocity of the at least one interfering object during the predetermined sequence of motions of the at least one interfering object.

7. The method of claim 2, wherein at least one of the at least one model parameters is one or more of a line index of a starting line or of an ending line of the interfering object in the height or occupancy map of the image, a gap index of a center gap between two parts of the interfering object in the height or occupancy map of the image, an average time difference between a trigger signal for the predetermined sequence of motions of the interfering object and a first detection of the predetermined sequence of motions in an occupancy map of the image, and a movement velocity of the interfering object.

8. The method of claim 1, wherein the at least one interfering object comprises a door and the predetermined sequence of motions comprises an opening or closing process of the door.

9. The method of claim 1, wherein the pixel values include height values and/or occupancy values of picture elements of the images.

10. A system for detecting target objects in an image sequence of a monitoring region, comprising:
a camera for recording the image sequence; and
an evaluation unit connected to the camera for data transmission and configured to:
adjust pixel values of images of the image sequence for interference components, the interference components originating from at least one interfering object situated in a control region;
search the image sequence for the target objects based on the adjusted pixel values; and
detect a start of a predetermined sequence of motions of the interfering object to determine an instantaneous position of the interfering object within the images during the sequence of motions, wherein the pixel values are adjusted based on the instantaneous position of the interfering object.

11. The system of claim 10, wherein the evaluation unit is further configured to:
evaluate a trigger signal received from a motion sensor or an operating element to detect the start of the predetermined sequence of motions; and
detect the start of the predetermined sequence of motions by evaluating images from the image sequence of the camera.

12. The system of claim 10, wherein the evaluation unit is further configured to compute the instantaneous position of the predetermined sequence of motions based on a movement model.

13. The system as of claim 10, wherein the camera is a stereo camera for generating two images each comprising individual images.

14. The system of claim 10, wherein the interfering object is a door and the sequence of motions is an opening motion of the door.

15. A vehicle for transporting persons, comprising:
at least one vehicle door;
an operating unit configured to generate a trigger signal for automatically opening the vehicle door; and
a system for detecting target objects in an image sequence of a monitoring region, the system comprising:
a camera for recording the image sequence; and
an evaluation unit connected to the camera for data transmission and configured to:
adjust pixel values of images of the image sequence for interference components, the interference components originating from at least one interfering object situated in a control region;
search the image sequence for the target objects based on the adjusted pixel values; and
detect a start of a predetermined sequence of motions of the interfering object to determine an instantaneous position of the interfering object within the images during the sequence of motions, wherein the pixel values are adjusted based on the instantaneous position of the interfering object, wherein the interfering object is the at least one vehicle door.

* * * * *